United States Patent
Leighton et al.

(10) Patent No.: US 7,074,729 B2
(45) Date of Patent: Jul. 11, 2006

(54) FABRIC-REINFORCED BELT FOR CONVEYING FOOD

(75) Inventors: Jay Philip Leighton, Charlotte, NC (US); Natalie B. Deal, Statesville, NC (US)

(73) Assignee: Siegling America, LLC, Huntersville, NC (US)

( * ) Notice: Subject to any disclaimer, the term of this patent is extended or adjusted under 35 U.S.C. 154(b) by 232 days.

(21) Appl. No.: 10/780,483

(22) Filed: Feb. 17, 2004

(65) Prior Publication Data

US 2004/0161990 A1   Aug. 19, 2004

Related U.S. Application Data

(60) Provisional application No. 60/448,037, filed on Feb. 18, 2003.

(51) Int. Cl.
  B32B 5/08 (2006.01)
  B32B 27/04 (2006.01)
  B32B 27/12 (2006.01)
  D03D 3/04 (2006.01)
  D03D 19/00 (2006.01)

(52) U.S. Cl. .................. 442/218; 442/43; 442/46; 442/126; 442/164; 442/203

(58) Field of Classification Search ............. 442/43, 442/46, 47, 58, 203, 218; 428/107, 109, 428/112
See application file for complete search history.

(56) References Cited

U.S. PATENT DOCUMENTS

| | | | | |
|---|---|---|---|---|
| 2,356,249 A | * | 8/1944 | Kremer et al. ............. 156/138 |
| 3,941,162 A | * | 3/1976 | McCabe et al. ......... 139/383 R |
| 3,973,670 A | * | 8/1976 | Spaar ....................... 198/847 |
| 4,064,915 A | | 12/1977 | Buyssens et al. |
| 4,168,340 A | | 9/1979 | Buyssens et al. |
| 4,769,202 A | | 9/1988 | Eroskey et al. |
| 4,770,290 A | | 9/1988 | Eroskey et al. |
| 4,820,143 A | | 4/1989 | Eroskey et al. |
| 5,316,132 A | | 5/1994 | Muraoka et al. |
| 5,558,207 A | | 9/1996 | Zabron et al. |
| 5,595,284 A | | 1/1997 | Takahashi et al. |
| 6,056,479 A | * | 5/2000 | Stevenson et al. ....... 405/302.7 |
| 6,174,825 B1 | * | 1/2001 | Dutt ........................... 442/43 |
| 6,540,069 B1 | | 4/2003 | Tschantz |
| 2004/0180591 A1 | * | 9/2004 | Haneburger ................ 442/2 |

FOREIGN PATENT DOCUMENTS

JP   06040535 A   2/1994

OTHER PUBLICATIONS

*Fairchild's Dictionary of Textiles*, Sixth Edition, I. B. Wingate, 1979, p. 349.

* cited by examiner

Primary Examiner—Jenna-Leigh Befumo
(74) Attorney, Agent, or Firm—Alston & Bird LLP

(57) ABSTRACT

A composite sheet includes a fabric that is at least partially embedded in a polymeric sheet. The fabric includes longitudinally extending warp yarns and laterally extending weft yarns, with there being one or more pairs of substantially spaced apart, yet adjacent, warp yarns. For each pair, the two warp yarns are sufficiently spaced apart from one another so that the composite sheet can be longitudinally slit between and distant from the two warp yarns, to provide one or more sections of the composite sheet that can be used as conveyor belts. The warp yarns are not exposed at the cut edges.

16 Claims, 7 Drawing Sheets

FABRIC-REINFORCED BELT FOR CONVEYING FOOD

CROSS-REFERENCE TO RELATED APPLICATION

The present application claims the benefit of U.S. Provisional Application No. 60/448,037, which was filed Feb. 18, 2003, and is incorporated herein by reference, in its entirety.

BACKGROUND OF THE INVENTION

The present inventions relate to composite sheets and, more particularly, to fabric-reinforced belts for conveying food that is being processed.

It is conventional to convey food that is being processed on conveyor belts that include polymeric materials, such as elastomeric polymeric materials. In some cases, the conveyor belts consist of woven fabrics that are coated or laminated with the polymeric material. In other cases, the conveyor belts consist of solid sheets of the polymeric material that are not reinforced with fabrics.

For a conveyor belt that consists of woven fabric that is coated or laminated with polymeric material, an advantage is that the fabric carcass substantially prevents the belt from stretching. On the other hand, a disadvantage is that the exposed fabric at the cut side edges of the belt can absorb fluids that can harbor hazardous microorganisms. Accordingly, it is common to seal cut side edges of fabric-reinforced belting material that is used to convey food that is being processed, so that the cut side edges do not absorb fluids. The material used for the edge sealing must be thick and abrasion resistant enough so that it does not wear through for a reasonable time. Such edge sealing materials are known to become dislodged from their belts, which is disadvantageous because the dislodged pieces can contaminate the food being processed.

Advantageously, edge sealing is not required for a conveyor belt consisting of a solid sheet of the polymeric material that is not reinforced with fabric, because the cut side edges of the belt do not absorb liquids. However, and disadvantageously, belts of this type can stretch because they are not reinforced with fabric.

Accordingly, there is a need in the art for an improved material that can be cut to an appropriate width and then be used as a conveyor belt of a food-processing machine, or the like, without having to seal the cut side edge or edges, and without the belt stretching too much.

BRIEF SUMMARY OF THE INVENTION

One aspect of the present invention is the provision of an improved composite sheet that can be cut to an appropriate width and then be used as a conveyor belt of a food-processing machine, or the like, preferably without having to seal the cut edge or edges of the belt, and preferably without the belt stretching too much.

In accordance with one aspect of the present invention, a composite sheet includes a fabric that is at least partially embedded in a polymeric sheet. Advantageously, the fabric restricts stretching of the composite sheet. As another advantage, the fabric includes longitudinally extending warp yarns and laterally extending weft yarns, with there being one or more pairs of substantially spaced apart, yet adjacent, warp yarns. For each pair, the two warp yarns are spaced apart from one another buy a sufficient distance so that the composite sheet can be longitudinally slit or cut at a position between and distant from the two warp yarns, to provide one or more long sections of the composite sheet that can be used as conveyor belts. Preferably the warp yarns are not exposed at the cut side edges or upper and lower surfaces of the sections of the composite sheet. As a result, the sections of the composite sheet can be advantageously used to convey food in a food-processing machine, or the like, without having to seal the cut side edge(s).

In accordance with one aspect of the present invention, weft yarns are exposed at the cut side edges of the sections of the composite sheet. However, and advantageously, the weft yarns are preferably polyester monofilament yarns and the composite sheet is preferably substantially absent of unfilled cavities. Therefore, and advantageously, the cut side edges preferably do not absorb fluids/do not have to be sealed.

In accordance with one aspect of the present invention, the warp yarns are confined to one or more longitudinally extending warp-including areas of the composite sheet, and any longitudinal cutting of the composite sheet is preferably done within one or more longitudinally extending warpless areas of the composite sheet. The warpless areas preferably do not include any of the warp yarns of the composite sheet. It is preferred for multiple of the warpless and warp-including areas of the composite sheet to be arranged in a laterally extending series, so that multiple locations for possible longitudinal cutting are provided. The warpless areas preferably each have a lateral width that is sufficiently large so that long sections of the composite material can be cut/slit lengthwise without cutting into, and thereby exposing, any of the warp yarns.

In one version of the present invention, each warp-including area includes only one warp yarn, and in other versions each warp-including area includes two, three or more warp yarns. It is preferred for the spacing between adjacent warp yarns that are located in the same warp-including area to be less than the lateral width of the warpless areas.

In accordance with one aspect of the present invention, all or some of the weft yarns, or at least portions of some or all of the weft yarns, melt together with the polymeric sheet. Although it is preferred for all of the embodiments of the present invention for the cut edges of the composite sheet to be substantially impermeable to fluid, such impermeability may be enhanced with the melting of the weft yarns and the polymeric sheet to one another. That is, in accordance with one aspect of the present invention, the cut side edges are substantially impermeable to fluid and/or there are no weft yarns apparent at the cut side edges and/or the cut side edges are substantially homogeneous.

The foregoing and some of the other aspects of the present invention are described in the following.

BRIEF DESCRIPTION OF THE DRAWINGS

Figure 1:
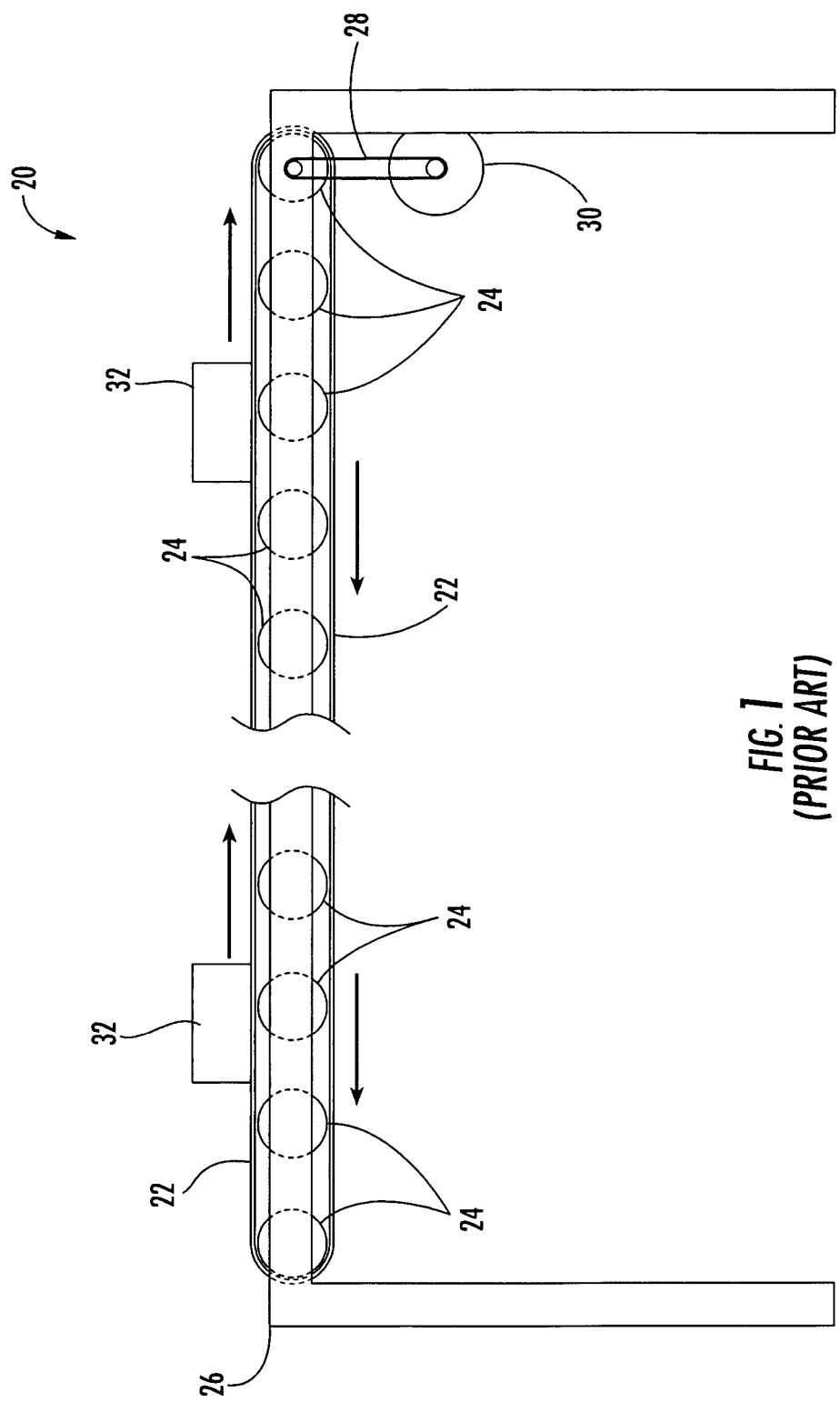
Figure 2:
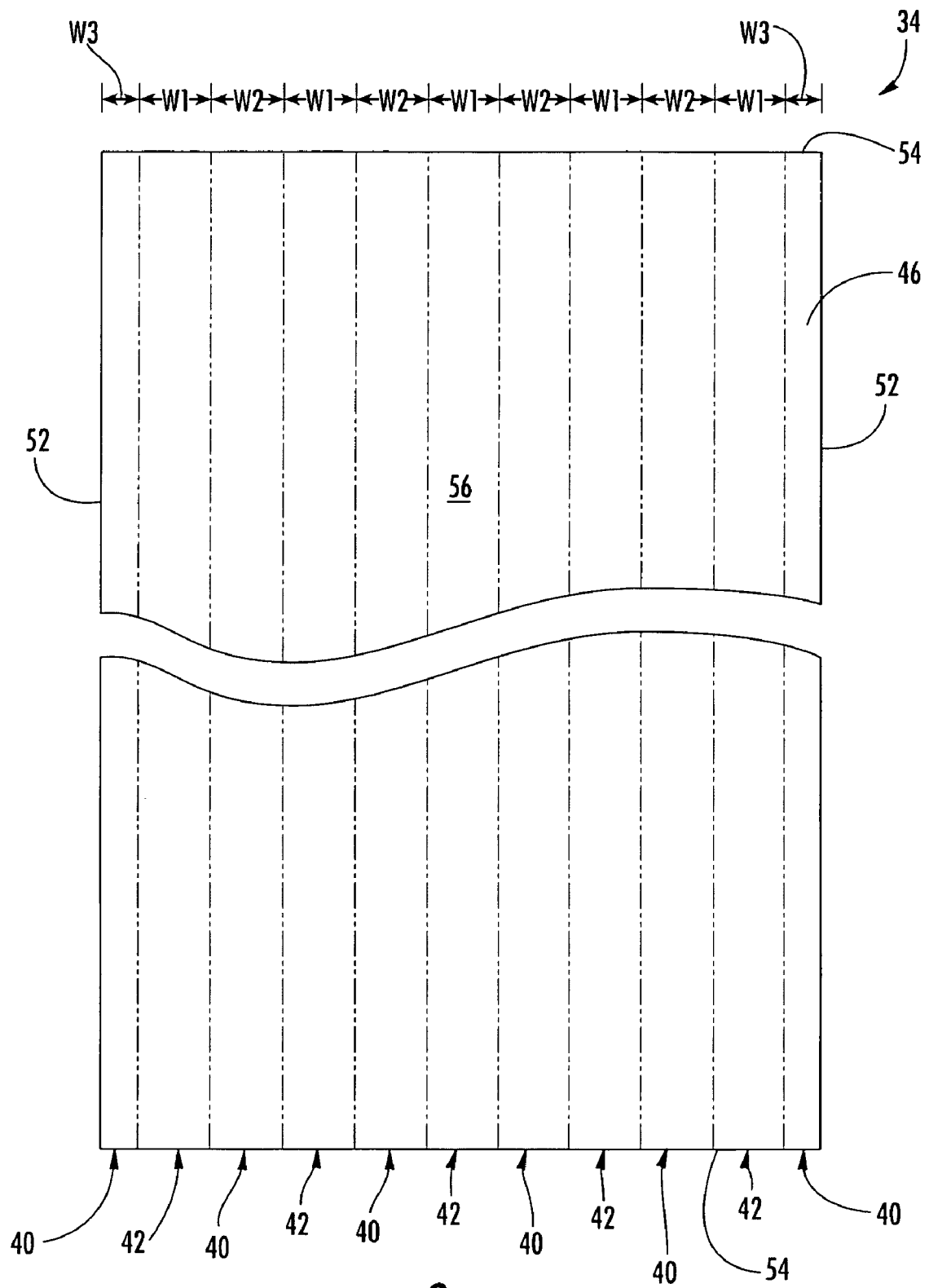
Figure 3:
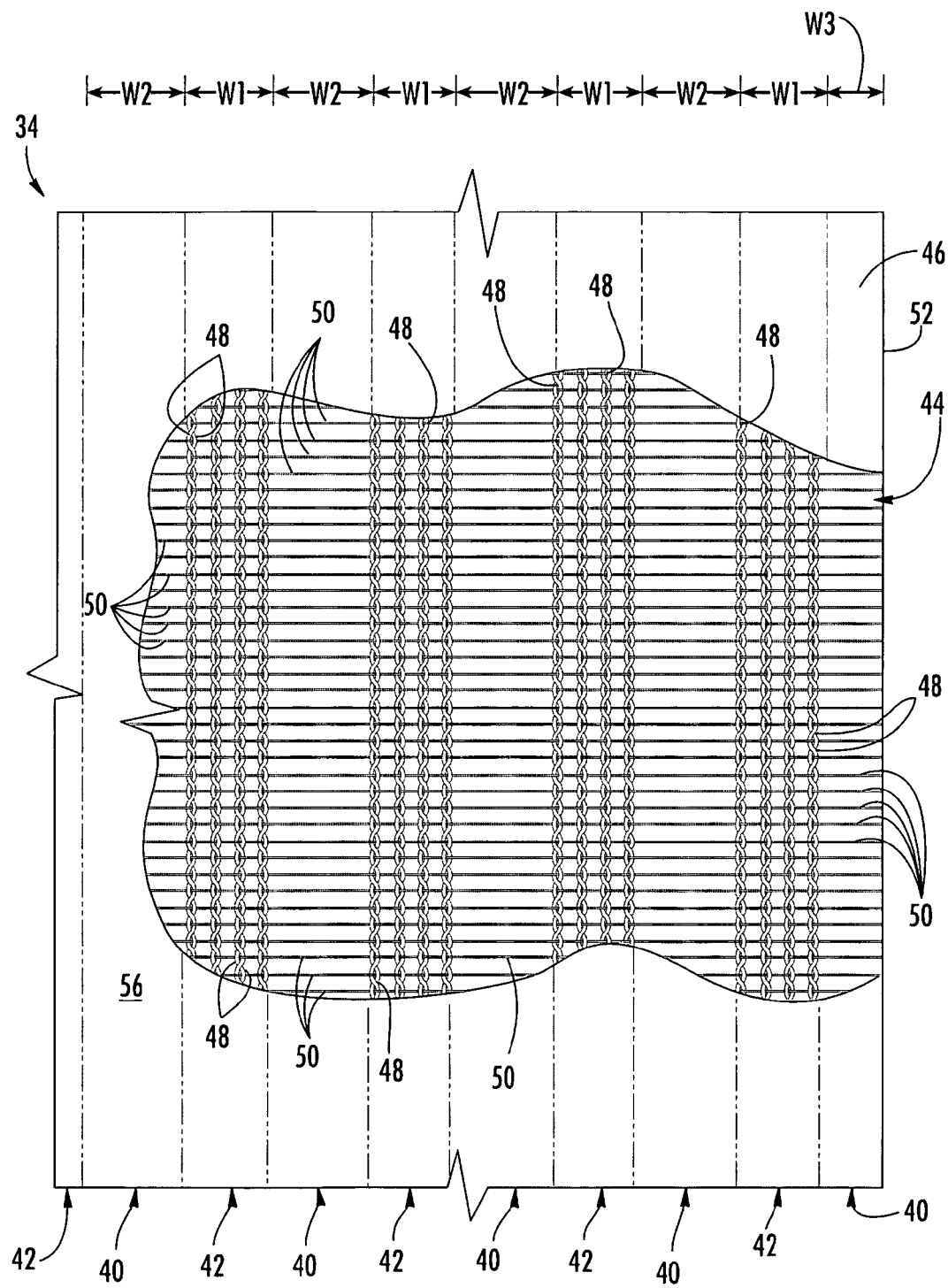
Figure 4:
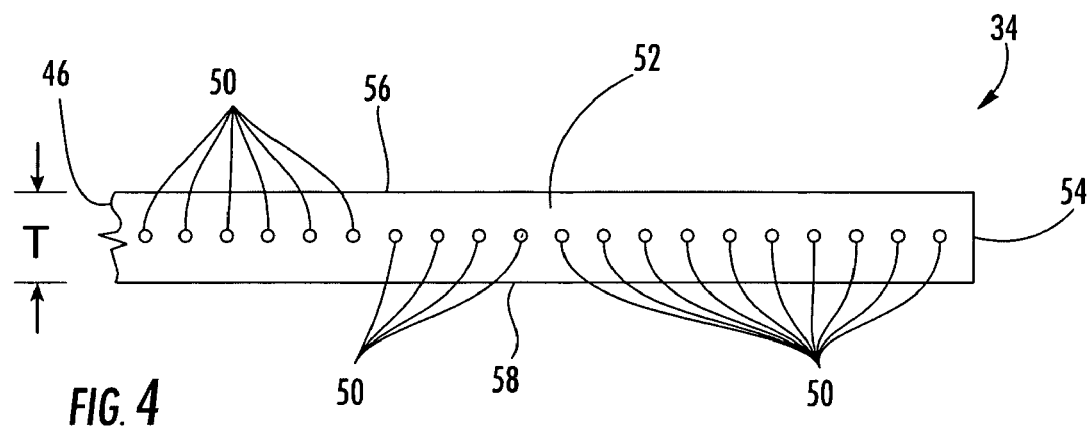
Figure 5:
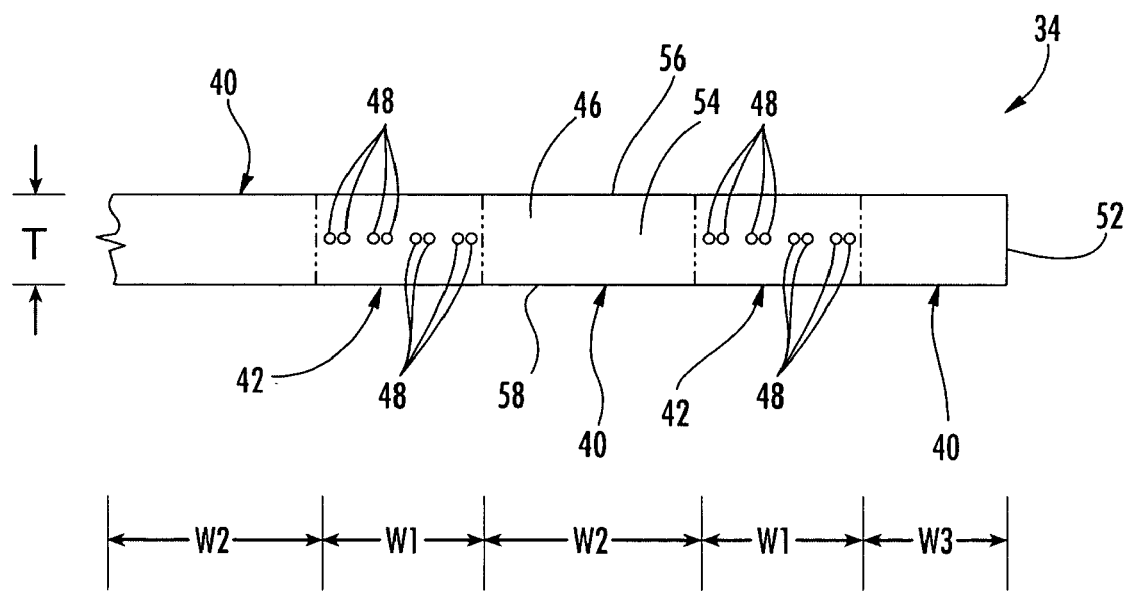
Figure 6:
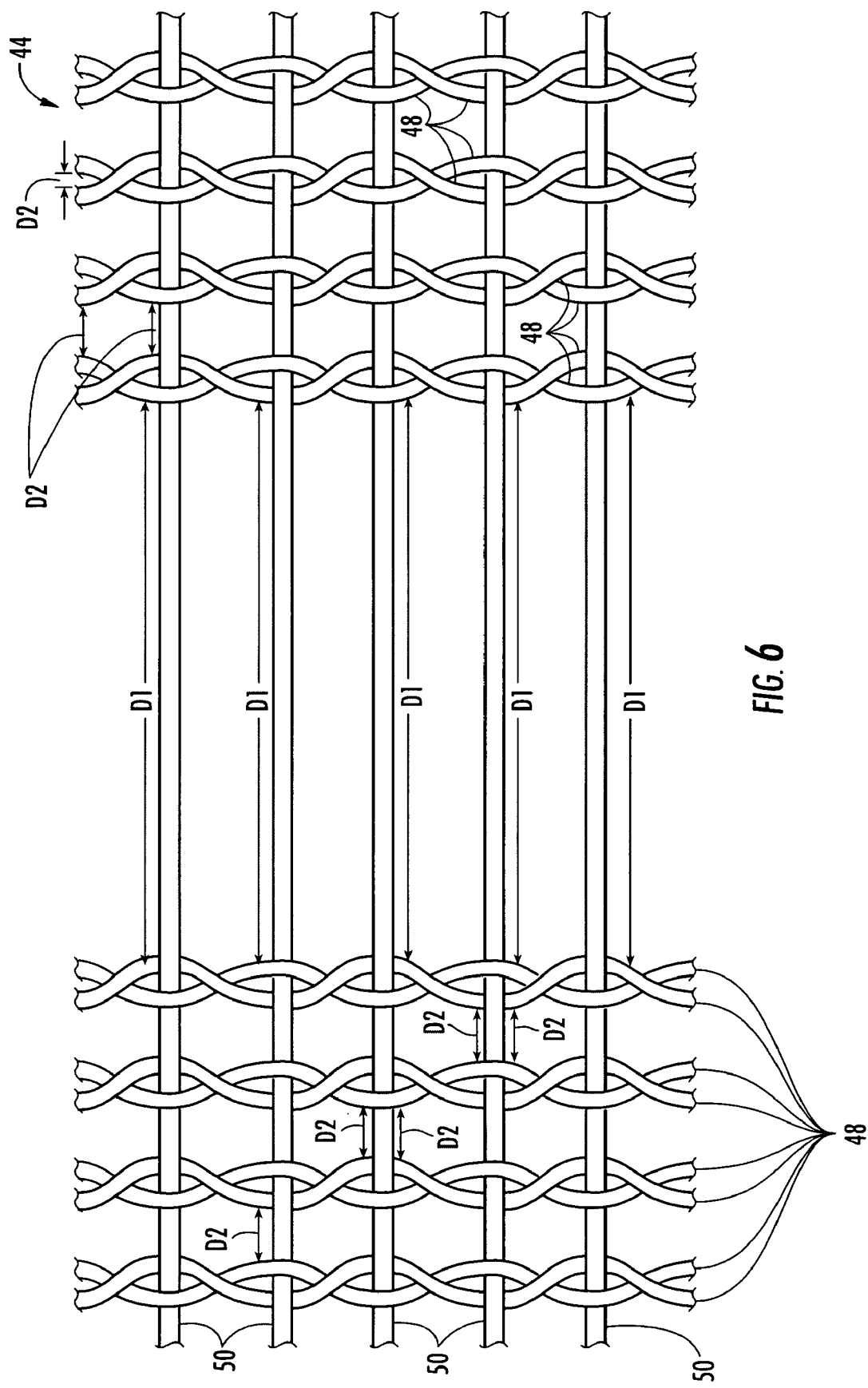
Figure 7:
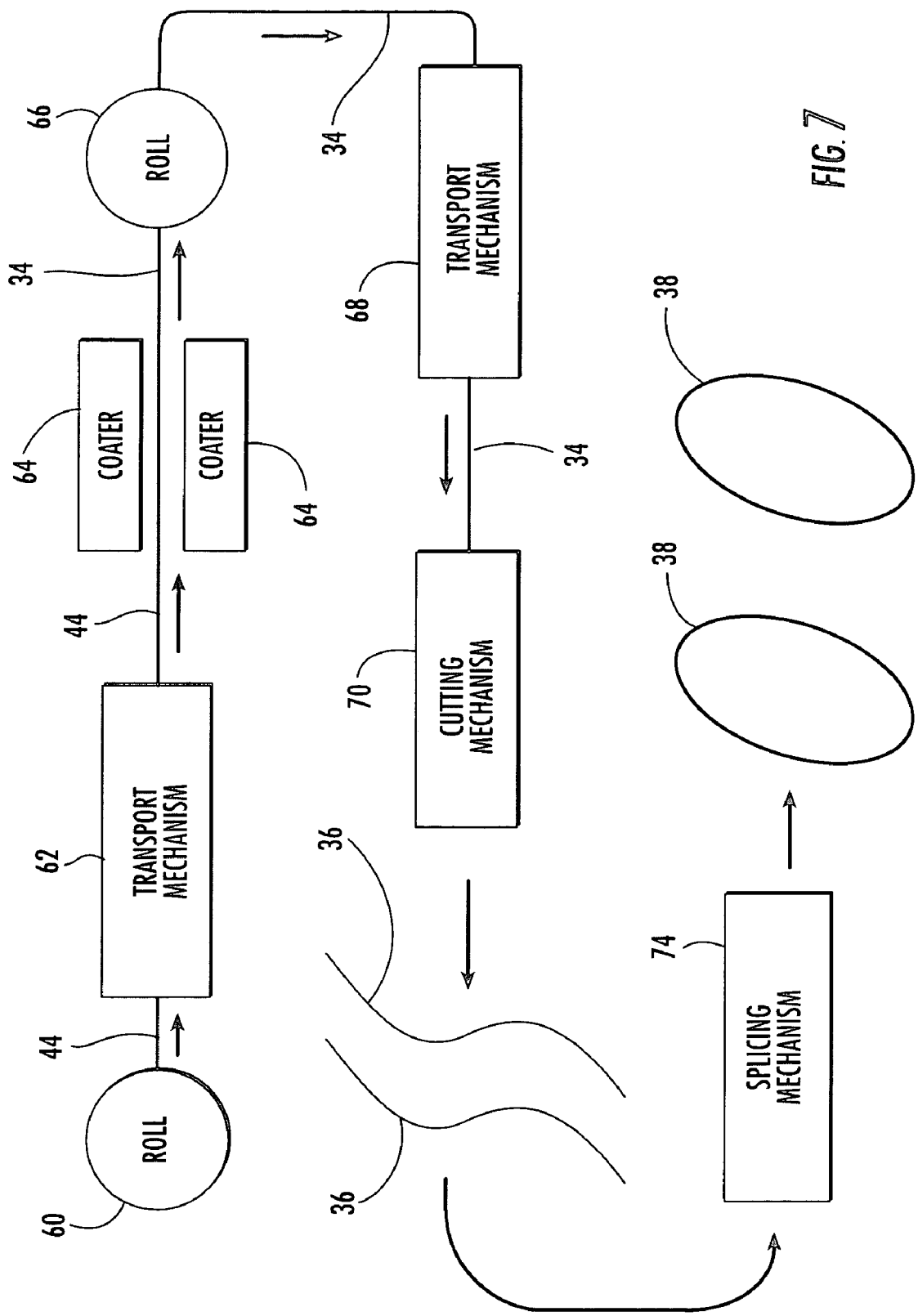
Figure 8:
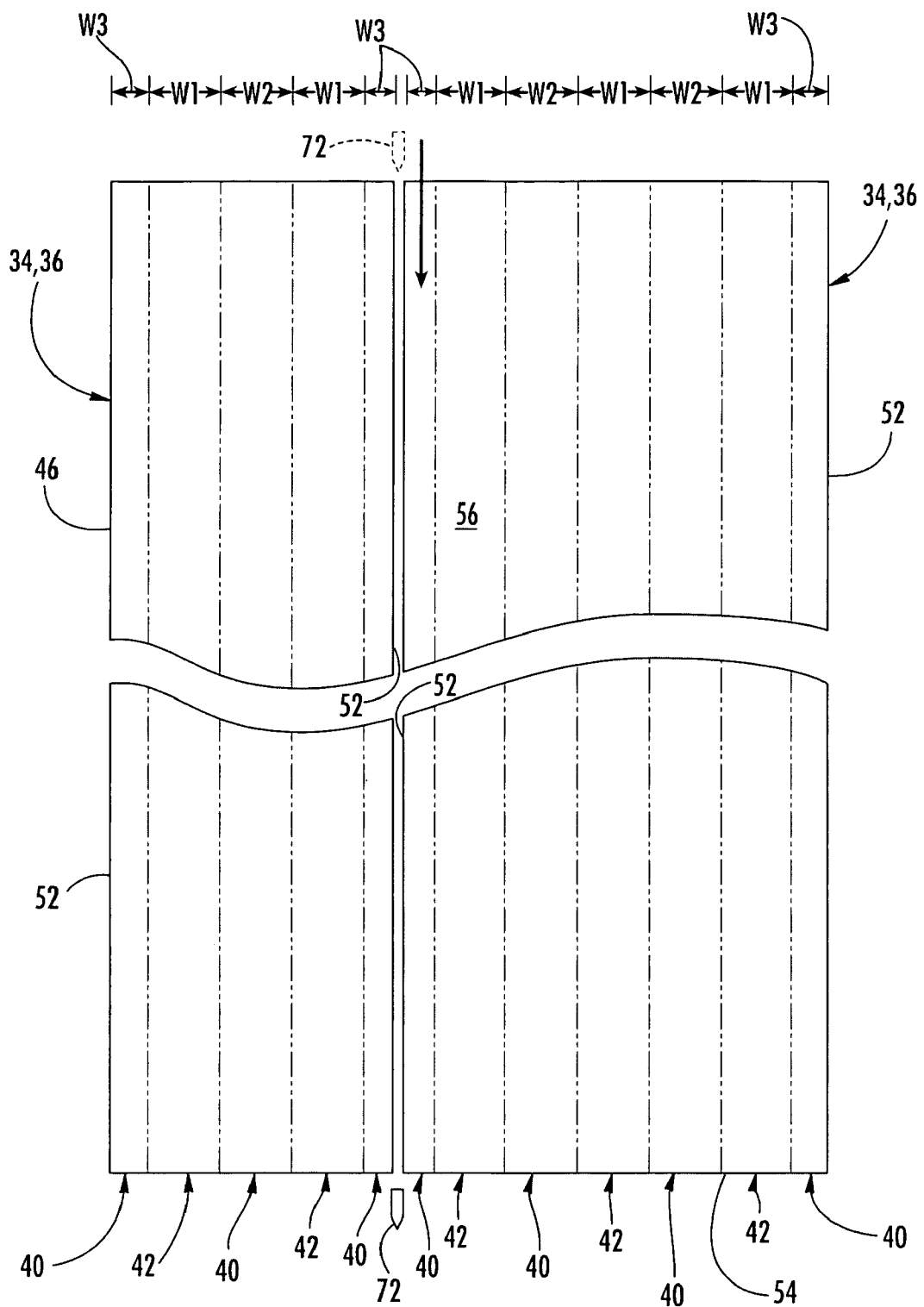

Having thus described the invention in general terms, reference will now be made to the accompanying drawings, which are not necessarily drawn to scale, and wherein:

FIG. 1 is a schematic, side elevational view of a prior art conveyor system, and FIG. 1 is illustrative of features of an exemplary embodiment of the present invention;

FIG. 2 is a partial, top plan view of a composite sheet that can be cut into sections that are made endless and used in place of the conveyor belt of FIG. 1, with phantom lines schematically illustrating longitudinally extending warpless and warp-including areas of the composite sheet, and the original longitudinally extending side edges of the composite sheet having already been trimmed away, in accordance with the exemplary embodiment of the present invention;

FIG. 3 is a partial, top plan view of the composite sheet of FIG. 2, with part of a polymeric sheet of the composite sheet removed to expose an embedded fabric of the composite sheet, with phantom lines schematically illustrating the warpless and warp-including areas;

FIG. 4 is an elevational view of a portion of a longitudinally extending side edge of the composite sheet of FIG. 2;

FIG. 5 is an elevational view of a portion of a laterally extending end edge of the composite sheet of FIG. 2;

FIG. 6 is an isolated, schematic, substantially enlarged view of a portion of the fabric of FIG. 3;

FIG. 7 diagrammatically illustrates methods and apparatus for forming the composite sheet of FIG. 2, and for forming endless sections of the composite sheet (e.g., endless conveyor belts), in accordance with the exemplary embodiment of the present invention; and FIG. 8 schematically illustrates a step of longitudinally cutting/separating sections of the composite sheet, in accordance with the exemplary embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 is a schematic, side elevational view of portions of a prior art conveyor system 20, and FIG. 1 is illustrative of some of the features of an exemplary embodiment of the present invention. The conveyor system 20 includes an endless conveyor belt 22 that extends around a plurality of rollers 24 that carry the conveyor belt and are rotatably mounted to a frame 26. The conveyor belt 22 is endless by virtue of opposite ends of the belt being joined together at a joint, which is preferably in the form of a splice. As illustrated in FIG. 1, the conveyor belt 22 is driven by virtue of one of the rollers 24 being driven. One or more of the rollers 24 are driven, such as via a drive belt 28, by a motor 30 that is mounted to the frame 26. A variety of other types of mechanisms for driving the conveyor belt 22 are also within the scope of the present invention. As illustrated in FIG. 1, the upper run of the belt is carrying/transporting food 32, or the like. The conveyor system 20 is preferably part of a food-processing machine that is for processing the food 32.

Referring to the top plan view of FIG. 2, one aspect of the present invention is an improved composite sheet 34 that can advantageously be cut longitudinally into sections 36 (FIGS. 7 and 8) that can be made into endless belts 38 (FIG. 7). The endless belts 38 can be used in place of the conveyor belt 22 of FIG. 1, such as for carrying/transporting food 32 that is being processed, or the like. It is preferred for any of such longitudinal cutting of the composite sheet 34 to be within longitudinally extending warpless areas 40 (e.g., areas without warp yarns), rather than being within longitudinally extending warp-including areas 42 (e.g., areas that include warp yarns). The areas 40, 42, which are arranged in a laterally extending series, are schematically illustrated by phantom lines in FIG. 2. As should be understood by those of ordinary skill in the art, phantom lines are imaginary lines formed by alternating two short dashes and a longer dash.

The composite sheet 34 is shown broken in the middle in FIG. 2 to disclose that it can be a variety of different lengths, and it can also be a variety of different widths, with the length preferably being many times greater than the width. More specifically, it is preferred for the composite sheet 34 to be manufactured in lengths of many feet, such as, but not limited to, a hundred feet or more, or a thousand feet or more. In accordance with the exemplary embodiment of the present invention, the width of the composite sheet 35, which is the distance between side edges 52 of the composite sheet/polymeric sheet 46, can be about seven feet or a little less, although a variety of other widths are also acceptable.

As best understood with reference to FIG. 3, the composite sheet 34 includes, and most preferably it consists essentially of, a fabric 44 that is preferably at least substantially embedded in a polymeric sheet 46. The fabric 44 can be characterized as defining the warpless and warp-including areas 40, 42. FIG. 3 is a partial, top plan view of the composite sheet 34, with an upper portion of the polymeric sheet 46 removed to expose a portion of the fabric 44. Phantom lines also schematically and partially illustrate the warpless and warp-including areas 40, 42 in FIGS. 3 and 5.

Referring to FIG. 3, the fabric 44 preferably includes warp yarns 48 extending in a longitudinal direction and weft yarns 50 extending in a lateral direction that is at least about perpendicular to the longitudinal direction. Throughout the figures, only a representative few of the yarns 48, 50 are respectively identified by their reference numerals in an effort to clarify the drawings. In accordance with the exemplary embodiment of the present invention, the warpless areas 40 preferably do not include any of the warp yarns 48, and each of the warp-including 42 areas preferably includes one or more of the warp yarns 48. In accordance with the exemplary embodiment of the present invention, all of the weft yarns 50 extend into each of the warpless and warp-including areas 40, 42, and preferably all of the weft yarns extend completely across each of the warpless and warp-including areas, especially after original, longitudinally extending side edges of the composite sheet 34 are trimmed, as will be discussed in greater detail below.

In accordance with the exemplary embodiment of the present invention, and as will be discussed in greater detail below, the fabric 44 advantageously provides sufficient strength in the warp direction to prevent undesired longitudinal stretching of the composite sheet 34, the fabric advantageously provides adequate space between the warp-including areas 42 for optimal slitting/cutting to width, and the fabric allows enough space between the weft yarns 50 to allow the polymeric material of the polymeric sheet 46 to originally flow around each of the weft yarns 50.

Referring respectively to FIGS. 2–5, the polymeric sheet 46 preferably includes: longitudinally extending side edges 52 that are laterally spaced apart from one another; laterally extending end edges 54 that are longitudinally spaced apart from one another; and outer, broad, upper and lower surfaces 56, 58 that each extend longitudinally and laterally between, and are contiguous with, the edges 52, 54. In accordance with the exemplary embodiment of the present invention, all of the warp and weft yarns 48, 50 of the fabric 44 are positioned between the upper and lower surfaces 56, 58, and none of the warp and weft yarns of the fabric are exposed at either of the upper and lower surfaces. For example, FIG. 2 is illustrative of none of the yarns 56, 58 of the fabric 44 being exposed at either of the upper and lower surfaces 56, 58 because FIG. 2 is illustrative of both top and bottom plan views of the composite sheet 34. As illustrated in FIG. 4, preferably none of the warp yarns 48 are exposed at either of the side edges 52, whereas the weft yarns 50 preferably are exposed at the side edges 52. In contrast, and as illustrated in FIG. 5, the warp yarns 48 preferably are exposed at the end edges 54.

In accordance with the exemplary embodiment of the present invention, the weft yarns 50 are not necessarily exposed at the original side edges of the composite sheet 34, but the original side edges (not shown) are preferably trimmed away to provide the illustrated side edges 52 at which the weft yarns are exposed. That is, and in accordance with the exemplary embodiment of the present invention, the original side edges of the composite sheet 34 may be ragged, such that they are cut away, which results in the side edges 52. Accordingly, a wide variety of constructions of the original side edges of the composite sheet 34 are within the scope of the present invention, because those original side edges are preferably cut away. Likewise, the illustrated end edges 54 are preferably formed by trimming. Alternatively, and if desired, special care can be taken to form the original edges in a manner such that they need not be cut away.

Referring to FIGS. 4 and 5, the polymeric sheet 46/composite sheet 34 preferably defines a thickness T that is defined between, and substantially perpendicular to, the upper and lower surfaces 56, 58. In accordance with the exemplary embodiment of the present invention, the thickness T is less than about 0.4 inches, more preferably the thickness T is about 0.04 inches to about 0.4 inches, and most preferably the thickness T is about 0.1 inches.

Referring primarily to FIG. 5, each of the warp-including areas 42 preferably has a laterally extending width W1 and includes all of the thickness of the polymeric sheet 46 that is within the width W1. In accordance with the exemplary embodiment of the present invention, each width W1 is at least about the diameter of a single one of the warp yarns 48, more preferably each width W1 is about the diameter of a single one of the warp yarns 48 to about one foot, and most preferably each width W1 is about 0.5 inches.

As also illustrated in FIG. 5, each of the interior warpless areas 40 preferably has a laterally extending width W2 and includes all of the thickness T of the polymeric sheet 46 that is within the width W2, and each of the outer warpless areas 40 preferably has a laterally extending width W3 and includes all of the thickness T of the polymeric sheet 46 that is within the width W3. In accordance with the exemplary embodiment of the present invention, each width W2 is greater than or at least about 0.3 inches, more preferably each width W2 is greater than or at least about 0.3 inches to about 1.5 inches, and most preferably each width W2 is about 0.6 inches. In accordance with the exemplary embodiment of the present invention, each width W3 is greater than or at least about 0.15 inches, more preferably each width W3 is greater than or at least about 0.15 inches to about 0.75 inches, and most preferably each width W3 is about 0.3 inches.

In accordance with an alternative embodiment of the present invention, the widths W3 are the same as, or about the same as, the widths W2. Indeed, alternative embodiments of the present invention can include variations upon the outer warpless areas 40, laterally extending widths W3 and longitudinally extending side edges 52 because, for example, in some cases longitudinal slitting (e.g., discussed below with reference to FIG. 8) is not necessary proximate the longitudinally extending side edges of the composite sheet 34. For example, in accordance with alternative embodiments of the present invention, wide composite sheets may include only one or very few warpless areas 40 in predetermined position(s) that are located solely where longitudinal slitting is desired. The only desired longitudinal slitting may be distant from the longitudinally extending side edges, such as by being along the centerline of the composite sheet.

FIG. 6 is an isolated, schematic, substantially enlarged view of a portion of the fabric 44, in accordance with the exemplary embodiment of the present invention. The lateral width W2 (FIGS. 2, 3 and 5) of each interior warpless area 40 (FIGS. 2, 3 and 5) preferably corresponds to a separation distance D1 (FIG. 6) between substantially spaced apart, yet adjacent, warp yarns 48 that respectively belong to adjacent warp-including areas 42 (FIGS. 2, 3 and 5). Accordingly, each separation distance D1 is greater than or at least about 0.3 inches, more preferably each separation distance D1 is greater than or at least about 0.3 inches to about 1.5 inches, and most preferably each separation distance D1 is about 0.6 inches. In accordance with the exemplary embodiment of the present invention, for pairs of adjacent warp yarns 48 that are within the same warp-including area 42, the separation distance D2 (FIG. 6) between the warp yarns of each pair is substantially less than the separation distance D1 between the substantially spaced apart, yet adjacent, warp yarns that respectively belong to adjacent warp-including areas 42.

As best understood with reference to FIGS. 3 and 6, it is preferred for the warp and weft yarns 48, 50 to form a relatively open weave in the warp-including areas 42. Preferably the weave inhibits unwanted slipping and displacement of the yarns 48, 50, and most preferably the weave is the leno weave. The leno weave is a conventional weave that should be understood by those of ordinary skill in the art. Those of ordinary skill in the art will understand that in an exemplary leno weaving process, the warp yarns are arranged in pairs, and the filling (i.e., weft yarns) are shot straight across the fabric as in a plain weave, except that the warp threads are alternately twisted in a right-hand and left-hand direction, crossing before each pick is inserted. The leno weave gives firmness and strength to an open-weave cloth, which reduces unwanted slipping and displacement of the yarns. That is, and in accordance with the exemplary embodiment of the present invention, the warp yarns 48 are preferably woven around the weft yarns 50 in a leno configuration so that in each of the warp-including areas 42, there are four pairs of closely adjacent warp yarns, with each pair about equally spaced from the adjacent pair. In accordance with the exemplary embodiment of the present invention, the leno weave provides substantial interlocking of the warp and weft yarns 48, 50 to one another, and this interlocking results in the fabric 44 being sufficiently stable during the process of substantially embedding the fabric in the polymeric sheet 46.

In accordance with the exemplary embodiment of the present invention, the warp yarns 48 can be any type of yarn that provides adequate tensile properties to preferably prevent undesirable stretching of the composite sheet 34, and preferably they are multifilament polyester yarns. More specifically, the warp yarns 48 can be about 500 denier yarns to about 2000 denier yarns, and they are preferably 1000 denier multifilament polyester yarns that are arranged so that each warp-including area 42 includes eight of the warp yarns. In accordance with the exemplary embodiment of the present invention, the alternating arrangement of the warp-including and warpless areas 42, 40 is repeated across the entire width of the fabric, resulting in an averaged count of about 7.2 warp yarns 48 per inch of width of the fabric 44.

In accordance with the exemplary embodiment of the present invention, a meaningful number of, more preferably a majority of, and most preferably all of the weft yarns 50 are a type of yarn that does not tend to absorb fluid (e.g., solid polyester monofilament yarns). More specifically, the weft yarns 50 are preferably about 560 denier polyester monofilament yarns that are uniformly spaced far enough apart so that the polymeric sheet substantially encapsulates the weft yarns. Preferably there are about 10 weft yarns 50 per inch of length of the fabric 44. In accordance with the exemplary embodiment of the present invention, the fabric 44 is available as Style No. 930202 from Milliken & Company of Spartanburg, S.C.; however, the fabric 44 can be any other type of fabric that imparts the desired effect to the composite sheet 34.

FIG. 7 diagrammatically illustrates methods and apparatus for forming the composite sheet 34, for cutting sections 36 from the composite sheet, and for making endless belts 38 from the sections, in accordance with the exemplary embodiment of the present invention. The fabric 44 is preferably unwound from a roll 60 and transported by one or more transport mechanisms 62 arranged along the travel path of the fabric 44 and/or the composite sheet 34. The fabric 44 is transported through a coater or between coaters 64. Any type of suitable coater(s) known in the art of wide web or textile coating may be used. In the coater or between the coaters 64, the fabric 44 is preferably at least substantially embedded in the polymeric sheet 46 to form the composite sheet 34. More specifically, the coaters 64 may utilize sheet extrusion, or extrusion calendaring, on both sides of the fabric 44 to at least substantially embed the fabric in the polymeric sheet 46. Alternatively, the coaters 64 may respectively laminate premade polymeric sheets to the sides of the fabric using sufficient heat to soften the sheets so that the sheets flow around the yarns 48, 50 of the fabric and the sheets adhere to one another at the edges of the fabric and through the spaces between the yarns of the fabric. In accordance with the exemplary embodiment of the present invention, the polymeric sheet 46 is an elastomeric material, and most preferably it is polyurethane, or the like.

As part of the coating process, or just downstream from the coaters 64, the composite sheet 34 may be passed between calendar cylinders, or the like, to impart a surface texture on one or both of the upper and lower surfaces 56, 58 of the composite sheet, and/or the composite sheet may be passed between chilled rollers for cooling purposes. The composite sheet 34 is then preferably formed into a roll 66. Thereafter, and in some cases at a different facility, the composite sheet is unwound from the roll 66 by one or more transport mechanisms 68 positioned along the travel path of the composite sheet. At a cutting mechanism 70, sections 36 are cut from the composite sheet 34. In accordance with the exemplary embodiment of the present invention, the sections 36 are cut both laterally and longitudinally.

As best understood with reference to FIG. 8, the sections 36 are preferably longitudinally cut from the composite sheet 34 with a slitter/knife 72, preferably along the centerline of one of the warpless areas 40, so that the warp yarns 48 are not exposed at the cut side edges 52 of the resulting sections, as shown in FIG. 4. That is, when the composite sheet 34 is slit/cut to width, the cut side edges 52 of the resulting sections 36 of the composite sheet preferably consist solely of the polymeric sheet 46 surrounding exposed terminuses of the weft yarns 50, as shown in FIG. 4.

Longitudinal relative movement between the knife 72 and the composite sheet 34 facilitates the longitudinal cutting with the knife. This longitudinal relative movement is schematically illustrated in FIG. 8 by virtue the knife 72 being illustrated by both solid and broken lines. The broken-line illustration of the knife 72 is illustrative of the before-cutting position and the solid-line illustration of the knife 72 is illustrative of the after-cutting position. The composite sheet 34/sections 36 are shown broken in the middle in FIG. 8 to disclose that they can be a variety of different lengths, and they can also be a variety of different widths, with the lengths preferably being many times greater than the widths. More specifically, it is preferred for the longitudinal cutting with the knife 72 to be continuous, with the cut extending for at least several feet, and in many situations the continuous cut will extend for ten feet to fifteen feet, twenty feet, thirty feet or more, or even greater lengths, such as, but not limited to, a hundred feet or more.

In addition or as an alternative to the slitter 72 being a knife with a sharp cutting edge, the slitter 72 can be an ultrasonic cutting device or another type of cutting device which heats the cut side edges 52 in an advantageous manner. For example, in some situations such heating, or heating by way of other means, can cause the portions of the weft yarns 50 which are proximate the cut side edges 52 and the portions of the polymeric sheet 46 which are proximate the cut side edges to melt together in an advantageous manner which is discussed in greater detail below Referring back to FIG. 7, each of the sections 36 is preferably joined end-to-end at a splicing mechanism 74 to form an endless belt 38. For each section 36, it is made into an endless belt 38 by bringing the two ends of the section together and melting the polymeric sheet 46 at the ends to form a thermoplastic splice. By making the splice in this manner, the warp yarns 48 proximate the splice are advantageously not exposed so that they cannot absorb liquid. That is, in accordance with the exemplary embodiment of the present invention, all of the warp yarns 48 of each endless belt 38 are fully encapsulated in the polymeric sheet 46 of the endless belt 38. As a result, and advantageously, the endless belts 38 can be used in place of the conveyor belt 22 of FIG. 1 for transporting food 32 during processing of the food, preferably without ever having to apply a sealant material to the side edges 52 of the endless belts 38. In accordance with an alternative embodiment of the present invention, some sealant may be applied to the side edges 52 and/or other surfaces of the belts 38.

In accordance with the exemplary embodiment of the present invention, it is preferred, for example, for none of the warp yarns 48 of the endless belts 38 to be exposed, and for each of the warpless and warp-including areas 40, 42 of an endless belt 38 to contain all of the weft yarns 50 of the endless belt. Although these and other configurations are preferred for the exemplary embodiment of the present invention, alternative embodiments of the present invention include variations of the preferred configurations of the exemplary embodiment. For example, in accordance with one embodiment of the present invention, it is acceptable for one or more of the warp yarns 48 of an endless belt 38 to be exposed at an exterior surface of the endless belt and/or for one or more of the weft yarns 50 of the endless belt not to extend into one or more of the warpless and warp-including areas 40, 42 of the endless belt.

In accordance with an alternative embodiment of the present invention, the fabric 44 is woven by means other than the leno weave. As one example, it is believed that another type of weave could be used in the warp-including areas 42, such as, but not limited to, a plain weave. In such situations, it may be beneficial to have the coater(s) 64 positioned immediately downstream from and closely adjacent to the weaving loom that is producing the fabric, so that the polymeric sheet 46 is applied to the fabric as the fabric exits the loom, without forming the fabric into a roll 60 between the steps of manufacturing the fabric and forming the composite sheet. In this alternative embodiment, it is believed that the polymeric sheet 46 could sufficiently restrict relative movement between the yarns of the fabric such that it would not be necessary to use the leno weave.

Indeed, in accordance one embodiment of the present invention, each of the warp-including areas 42 includes only one warp yarn so that each of the warp-including areas would have a width of about the diameter of the warp yarns; and in this embodiment it would be preferred for each of the warp-including areas to include all of the weft yarns, and for the warp and weft yarns to be respectively interlaced with one another such that the fabric is plainly woven or woven in any other suitable manner. In other versions of this embodiment, each of the warp-including sections could include two, three or more warp yarns, and preferably: for each pair of adjacent warp yarns that are within the same warp-including area, the spacing between the warp yarns of the pair is less than the spacing between adjacent warp-including areas; each of the warp-including areas includes all of the weft yarns; and the warp and weft yarns are respectively interlaced with one another such that the fabric is plainly woven or woven in any other suitable manner.

Although it is preferred, in accordance with the exemplary embodiment and some of the other embodiments of the present invention, for the yarns of the fabric to be respectively interlaced with one another such that the fabric is woven, other types of fabrics can be used in place of the woven fabrics.

Other alternative embodiments can be respectively identical to each of the exemplary and other embodiments described herein, except for variations noted and variations that will be apparent to those of ordinary skill in the art in view of this disclosure. In accordance with each of these alternative embodiments, the weft yarns 50 of the fabric 44 can be the same type of material as the polymeric sheet 46 (e.g., a polyester elastomeric or a polyester urethane elastomeric), or the materials of the fabric 44 and the polymeric sheet 46 are otherwise selected, so that the weft yarns 50, or at least some or portions of the weft yarns 50, melt into the polymeric sheet 46 when the polymeric sheet is applied to the fabric 44, or at some other time, and the melted weft yarns or melted portions of the weft yarns become part of the polymeric sheet, such that the composite sheet 34 does not include any weft yarns or reduced numbers and/or portions of weft yarns. For example, the coater(s) 64 (FIG. 7) could be operated so that during the above-described coating process, the temperature of the polymeric sheet 46 is above each of its melting point and the melting point of the weft yarns 50. Although it is preferred for all of the embodiments of the present invention for the cut side edges 52 to be substantially impermeable to fluid, such impermeability may be enhanced by the melting of the weft yarns 50 into the polymeric sheet 46. That is, in accordance with the present alternative embodiments, the cut side edges 52 are substantially impermeable to fluid and/or there are no weft yarns 50 apparent at the cut side edges 52 and/or the cut side edges 52 are substantially homogeneous. In accordance with another embodiment of the present invention, any appearance of the weft yarns 50 at the cut side edges 52 is minimized by having the weft yarns 50 be the same color as the polymeric sheet 46.

In one example, a hot iron (not shown) is rubbed along/proximate the cut side edges 52 of the composite sheet 34 in an effort to eliminate any bubbles in the polymeric sheet 46 which might have been exposed by the cutting of the edges. In addition, the hot iron, or other heating equipment, could be used, such as when the weft yarns 50 of the fabric 44 are the same type of material as the polymeric sheet 46 (or where these materials are otherwise selected to provide the desired end result), to cause the portions of the weft yarns which are proximate the cut side edges 52 and the portions of the polymeric sheet which are proximate the cut side edges to melt together such that the cut side edges 52 are substantially impermeable to fluid and/or there are no weft yarns 50 apparent at the cut side edges 52 and/or the cut side edges 52 are substantially homogeneous. As another example, any of the above-discussed melting together can also be achieved by passing the composite sheet 34 through heated nip rolls or by way of any other means for obtaining the desired result.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A composite sheet, comprising:
a fabric that is at least partially embedded in a polymeric sheet, with the fabric including warp yarns extending in a longitudinal direction and weft yarns extending in a lateral direction that is at least about perpendicular to the longitudinal direction, wherein:
the polymeric sheet includes:
longitudinally extending edges that are laterally spaced apart from one another,
outer, longitudinally extending, first and second surfaces that extend laterally between, and are contiguous with, the edges, and
a thickness that is defined between, and substantially perpendicular to, the first and second surfaces;
all of the warp yarns of the composite sheet and all of the weft yarns of the composite sheet:
are positioned between the first and second surfaces, and
are not exposed at either of the first and second surfaces;
pluralities of longitudinally extending first and second areas of the polymeric sheet are arranged in an alternating, laterally extending series such that each of the first areas is contiguous with at least one of the second areas,
for each of the first areas:
at least a plurality of the weft yarns extend laterally through the first area, and
at least a plurality of the warp yarns extend longitudinally through the first area; and
for each of the second areas:
none of the warp yarns of the composite sheet are located in the second area;
at least a plurality of the weft yarns extend laterally through the second area;

the second area has a laterally extending width and includes all of the thickness of the polymeric sheet that is within the width, and the width of the second area is at least about 0.3 inches;

wherein at least one of the longitudinally extending edges of the composite sheet is a cut edge formed by cutting a wider composite sheet along a longitudinal cut line located in one of the second areas of the sheet such that the weft yarns extend all the way to the cut edge and terminate at the cut edge.

2. A composite sheet according to claim 1, wherein the yarns are respectively interlaced with one another such that the fabric is woven.

3. A composite sheet according to claim 1, wherein all of the weft yarns of the composite sheet extend into each of the first and second areas.

4. A composite sheet according to claim 1, wherein each first area includes at least three of the warp yarns.

5. A composite sheet according to claim 1, wherein at least a majority of the weft yarns of the composite sheet are monofilament yarns.

6. A composite sheet according to claim 1, wherein none of the warp yarns of the composite sheet are exposed at either of the edges.

7. A composite sheet according to claim 6, wherein none of the warp yarns of the composite sheet is closer than about 0.15 inches from either of the edges.

8. A composite sheet according to claim 1, wherein the composite sheet is in the form of an endless belt.

9. An endless belt according to claim 8, wherein all of the warp yarns of the endless belt are fully encapsulated in the polymeric sheet.

10. An endless belt according to claim 8, wherein the endless belt extends around a plurality of rollers that carry the belt and are rotatably mounted to a frame.

11. A belt for conveying food, comprising:

a composite sheet having opposite ends, the composite sheet being formed into a loop and the opposite ends being spliced together to form the belt as an endless loop, the belt having opposite longitudinally extending edges;

the composite sheet being cut from a wider composite sheet along at least one longitudinally extending cut line that forms at least one of the longitudinally extending edges of the belt as a cut edge;

the composite sheet comprising a fabric completely encapsulated in a polymeric material, the polymeric material forming opposite major surfaces of the belt, a thickness of the belt being defined between the opposite major surfaces;

the fabric comprising a plurality of warp yarns extending in a length direction parallel to the opposite longitudinally extending edges, and a plurality of weft yarns extending in a width direction of the belt between the opposite longitudinally extending edges and being spaced apart in the length direction;

the warp yarns being arranged in a plurality of groups spaced apart in the width direction, each group comprising a plurality of warp yarns spaced apart in the width direction with a spacing less than a spacing between the groups, such that regions between the groups of warp yarns are free of warp yarns; and the cut edge being located in one of the regions free of warp yarns, and the weft yarns extending to the cut edge and terminating at the cut edge.

12. The belt for conveying food of claim 11, wherein the ends of the weft yarns at the cut edge are melted along with the polymeric material of the composite sheet at the cut edge and then re-solidified such that an intimate melt-sealed interface exists between the ends of the weft yarns and the polymeric material at the cut edge.

13. The belt for conveying food of claim 11, wherein the weft yarns are uniformly spaced apart in the length direction.

14. The belt for conveying food of claim 13, wherein there are about 10 weft yarns per inch in the length direction.

15. The belt for conveying food of claim 11, wherein the warp yarns are multifilament yarns and the weft yarns are monofilament yarns.

16. The belt for conveying food of claim 15, wherein the warp yarns have a denier of about 500 to about 2000, and the weft yarns have a denier of about 560.

* * * * *